(12) United States Patent
Porod et al.

(10) Patent No.: US 11,213,985 B2
(45) Date of Patent: Jan. 4, 2022

(54) INJECTION UNIT FOR A SHAPING MACHINE

(71) Applicant: ENGEL AUSTRIA GmbH, Schwertberg (AT)

(72) Inventors: Florian Porod, St. Valentin (AT); Paul Riener, Hargelsberg (AT); Richard Czepl, St. Valentin (AT); Guenter Schott, St. Valentin (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 657 days.

(21) Appl. No.: 15/713,044

(22) Filed: Sep. 22, 2017

(65) Prior Publication Data
US 2018/0085984 A1 Mar. 29, 2018

(30) Foreign Application Priority Data
Sep. 23, 2016 (AT) .............. A 50854/2016

(51) Int. Cl.
*B29C 45/70* (2006.01)
*B29C 45/62* (2006.01)
(Continued)

(52) U.S. Cl.
CPC .............. *B29C 45/70* (2013.01); *B29C 45/17* (2013.01); *B29C 45/62* (2013.01); *B29C 45/66* (2013.01)

(58) Field of Classification Search
CPC ......... B29C 45/70; B29C 45/17; B29C 45/62; B29C 45/66
(Continued)

(56) References Cited

U.S. PATENT DOCUMENTS 4,708,622 A 11/1987 Hehl
4,731,005 A 3/1988 Hehl
(Continued)

FOREIGN PATENT DOCUMENTS

DE 36 37 885 5/1988
DE 3735769 6/1989
(Continued)

OTHER PUBLICATIONS

Engineering Toolbox NPL (Year: 2010).*
(Continued)

*Primary Examiner* — Michael H. Wilson
*Assistant Examiner* — Guy F Mongelli
(74) *Attorney, Agent, or Firm* — Wenderoth, Lind & Ponack, L.L.P.

(57) ABSTRACT

An injection unit for a shaping machine includes a plasticizing cylinder which has a collar and a carrier portion which has a trough. The plasticizing cylinder is arranged in the trough, and an axial movement of the plasticizing cylinder relative to the carrier portion is restrained in positively locking engagement by the collar bearing against the carrier portion. A clamping element which is fixed or shaped on the plasticizing cylinder is fixed by fixing elements to the carrier portion in such a way that the plasticizing cylinder is braced between the trough and the clamping element. The plasticizing cylinder is braced by bracing elements against lifting of the collar off the carrier portion in an axial direction of the plasticizing cylinder.

10 Claims, 6 Drawing Sheets

(51) Int. Cl.
*B29C 45/17* (2006.01)
*B29C 45/66* (2006.01)

(58) Field of Classification Search
USPC .................................................. 425/192 R
See application file for complete search history.

(56) References Cited

U.S. PATENT DOCUMENTS

| | | | | |
|---|---|---|---|---|
| 4,877,389 | A | 10/1989 | Hehl | |
| 5,261,807 | A * | 11/1993 | Hehl | B29C 45/20 425/192 R |
| 2003/0047827 | A1 * | 3/2003 | Weinmann | B29C 45/561 264/40.5 |
| 2003/0203068 | A1 * | 10/2003 | Wohlrab | B29C 45/66 425/589 |
| 2004/0191360 | A1 * | 9/2004 | Koch | B29C 45/17 425/589 |
| 2005/0060996 | A1 * | 3/2005 | Pellizzari | F16F 1/06 60/517 |
| 2008/0268084 | A1 * | 10/2008 | Nogueira | B29C 45/66 425/451.9 |
| 2009/0252511 | A1 * | 10/2009 | Watanabe | G03G 15/50 399/45 |
| 2010/0272841 | A1 * | 10/2010 | Shimizu | B29C 48/288 425/113 |
| 2013/0064922 | A1 * | 3/2013 | Galt | B29C 45/2703 425/549 |
| 2013/0337103 | A1 * | 12/2013 | Chiang | B29C 45/66 425/589 |
| 2016/0279854 | A1 * | 9/2016 | Fitzpatrick | B29C 45/74 |

FOREIGN PATENT DOCUMENTS

| | | |
|---|---|---|
| DE | 42 35 659 | 4/1994 |
| EP | 0 198 364 | 10/1986 |
| EP | 0 314 942 | 5/1989 |
| JP | 2008-290373 | 12/2008 |

OTHER PUBLICATIONS

Tannerbolt NPL (http://web.archive.org/web/20160120232554/https://resources.tannerbolt.com/articles/3-common-screw-types-at-a-glance-machine-sheet-metal-and-cap-screws/) (Year: 2016).*

Plastics Technology NPL (https://www.ptonline.com/articles/how-much-ld-do-you-really-need) (Year: 2016).*

Engineering Toolbox NPL (https://web.archive.org/web/20160112182804/https://www.engineeringtoolbox.com/young-modulus-d_417.html) (Year: 2016).*

* cited by examiner

INJECTION UNIT FOR A SHAPING MACHINE

BACKGROUND OF THE INVENTION

1. Field of the Invention

The present invention concerns an injection unit for a shaping machine and a method of assembling a plasticizing cylinder to a carrier portion of an injection unit for a shaping machine.

2. Description of the Related Art

Shaping machines can preferably be injection molding machines. Transfer molding apparatuses, presses and the like are however also conceivable.

The required injection pressure for example in an injection molding process can be achieved by a plasticizing screw being pressed under a high force into the plasticizing cylinder and thus exerting the required pressure on the melt cushion. The plasticizing cylinder is subjected to tensile stressing by that force and stretching occurs in the axial direction. That makes it necessary to lock the plasticizing cylinder relative to a carrier portion.

That locking action can be achieved by a collar which bears against the carrier portion and carries the force during the injection operation by virtue of axial positively locking engagement.

A clamping element which is shaped on or fixed to the plasticizing cylinder is also known, the clamping element being fixed by means of fixing elements to the carrier portion in such a way that the plasticizing cylinder is braced between the trough and the clamping element—preferably in lying relationship—and is thereby fixed. In the state of the art, that clamping element carries those forces which occur for example upon with withdrawal of the screw and when the plasticizing cylinder is pressed against a sprue bushing.

The plasticizing cylinder is also referred to as the plasticizing barrel.

For example DE 36 37 885 A1 discloses an injection unit, the plasticizing cylinder having a collar. The carrier portion to which the plasticizing cylinder is mounted has a trough, wherein the plasticizing cylinder is arranged in the trough and wherein an axial movement of the plasticizing cylinder relative to the carrier portion is prevented in positively locking engagement by the collar bearing against the carrier portion. In that case the arrangement of the collar relative to the carrier portion is such that the collar restrains such movements of the plasticizing cylinder relative to the carrier portion, that would be induced by the forces occurring in the injection operation, on the plasticizing cylinder.

A disadvantage with the structure of DE 36 37 885 A1 is that the bracing elements must be of a relatively complex nature in the form of bracing cylinders. Forces normal to the direction of movement of the bracing cylinders give rise to high flexural moments and have an adverse effect on wear and sealing integrity.

A further construction for a locking means for a plasticizing cylinder on the carrier portion is known from EP 0 314 942 A1. In that case the plasticizing cylinder is not arranged in a trough but is guided by a bore in the carrier portion. In that way a plasticizing cylinder which is for example balanced on a crane cannot be inserted into the carrier portion from above, and that makes assembly more difficult.

In addition that structure is quite complex and a further major disadvantage is that those parts which produce the positively locking action upon injection are designed to be moveable. It will be appreciated that the mounting for such parts is prone to wear and failure. A collar in this embodiment is used only as a support to provide the described positively locking action by means of moveable parts.

DE 42 35 659 A1 discloses an injection unit, wherein the plasticizing cylinder is braced against the carrier portion by means of an inclined clamping wedge member.

SUMMARY OF THE INVENTION

An object of the present invention is to provide an injection unit and an assembly method which permit both a simplified structure and also simplified assembly in comparison with the state of the art.

In regard to the injection unit that object is achieved in that the plasticizing cylinder is braced by means of bracing elements against lifting of the collar off the carrier portion in an axial direction of the plasticizing cylinder. Neither complex bracing elements nor moveable parts are necessary.

In regard to the assembly method that is achieved in that the plasticizing cylinder:
- is arranged in a trough of the carrier portion,
- is braced by means of bracing elements against lifting of the collar off the carrier portion in an axial direction of the plasticizing cylinder, and
- is braced by means of fixing elements between a clamping element and the trough.

In that way a plasticizing cylinder which is suspended a balanced condition can be arranged from above in the trough and can be manipulated and assembled in a very simple fashion.

In that case the collar preferably locks against forces which occur upon injection. This means a force is produced, which causes stretching of the plasticizing cylinder due to the injection operation (that is to say by the forward movement of a plasticizing screw or an injection plunger arranged in the plasticizing cylinder), the viscosity of the melt and the pressure of the melt which rises to its maximum during the injection operation. The positively locking action by means of the collar—which is preferably fixedly connected to the plasticizing cylinder—provides for secure locking against the high axial forces occurring in the injection operation, without moveable parts.

The bracing elements—supported by the frictional engagement between the clamping element and the trough—carry those forces which occur when the plasticizing cylinder (or the injection nozzle) is pressed against a bushing and upon retraction of the screw (in the plasticizing cylinder). In other words, the collar is prestressed against the carrier portion by the bracing elements.

This therefore provides in a simple fashion that the contact of the collar against the carrier portion is without play—and more specifically preferably in all situations.

In addition the invention allows the plasticizing cylinder to be quickly changed as the time required for fixing the clamping element is short and the operation can be carried out with commercially usual tools. That has a positive effect on production as stoppage times can be minimized.

A further advantage of the structure according to the invention lies in the small axial space required for the bracing action by means of the clamping element, whereby the entire injection unit can be shorter.

Protection is further claimed for a shaping machine with an injection unit according to the invention.

Further advantageous configurations of the invention are recited in appendant claims.

In a particularly simple configuration the fixing elements are in the form of fixing screws which pass through bores in the clamping element and cooperate with fixing threads in the carrier portion. Such fixing screws are simple and inexpensive to manufacture and allow the plasticizing cylinder to be fitted in place using commercially usual tools. No special tools at all are required.

Naturally the fixing elements can also be hydraulic or electric. In that case the bracing action can be effected automatically.

Due to the elongation of the plasticizing cylinder that occurs in the injection operation the clamping element is displaced from the point of view of the carrier portion in the direction of the nozzle (that is to say towards the front end of the plasticizing cylinder). That also involves a relative movement between the clamping element and the carrier portion whereby the fixing elements are exposed to a flexural loading.

Preferably therefore it can be provided that a ratio of a first equivalent spring stiffness for tensile loadings of the plasticizing cylinder and a second equivalent spring stiffness for flexural loadings of the fixing elements—in particular the fixing screws—is greater than 500, preferably greater than 1000 and particularly preferably greater than 1500.

Such matching of the degrees of stiffness of the structure—in particular the fixing elements—to the geometrical arrangement and the cyclic loadings occurring for example in the injection molding procedure can practically eliminate influences arising out of wear and material fatigue and extremely long service lives can be achieved.

The bracing elements can act—preferably with being supported on the carrier portion—on the clamping element, the collar and/or the plasticizing cylinder.

The bracing elements can particularly easily be in the form of pressure screws whereby they are easy and inexpensive to manufacture. In addition that allows assembly using standard tools. Alternatively the bracing elements can be hydraulic—therefore for example in the form of hydraulic cylinders—or electric, which can allow automatic assembly.

The pressure screws can be supported by way of bracing threads arranged in bores in the carrier portion, and can contact the clamping element, the collar and/or the plasticizing cylinder.

The clamping element can be in the form of a—preferably flat—plate. It will be appreciated that other shapes are also conceivable. For example the clamping element can be curved (like a yoke), in particular in the form of a plate which is curved elliptically, in particular in a circular configuration. However more general shapes can also be advantageous, in which respect a prismatically shaped clamping element can serve as an example.

These measures also serve to further simplify the structure and to keep down the manufacturing costs of the individual parts and the overall construction.

The clamping element can be assembled to the plasticizing cylinder before the plasticizing cylinder is arranged in the trough. On the one hand that has the advantage that upon assembly correct orientation of the plasticizing cylinder occurs of its own accord (due to the force of gravity). Secondly production can go on while the clamping element is being pre-assembled. That therefore also contributes to reducing the actual assembly time.

The clamping element can be (pre-)assembled upon manufacture of the plasticizing cylinder or—as mentioned—at the operator of the injection unit.

BRIEF DESCRIPTION OF DRAWINGS

Further advantages and details of the invention will be apparent from the Figures and the related specific description. In the Figures.

DETAILED DESCRIPTION OF THE INVENTION

Figure 1:
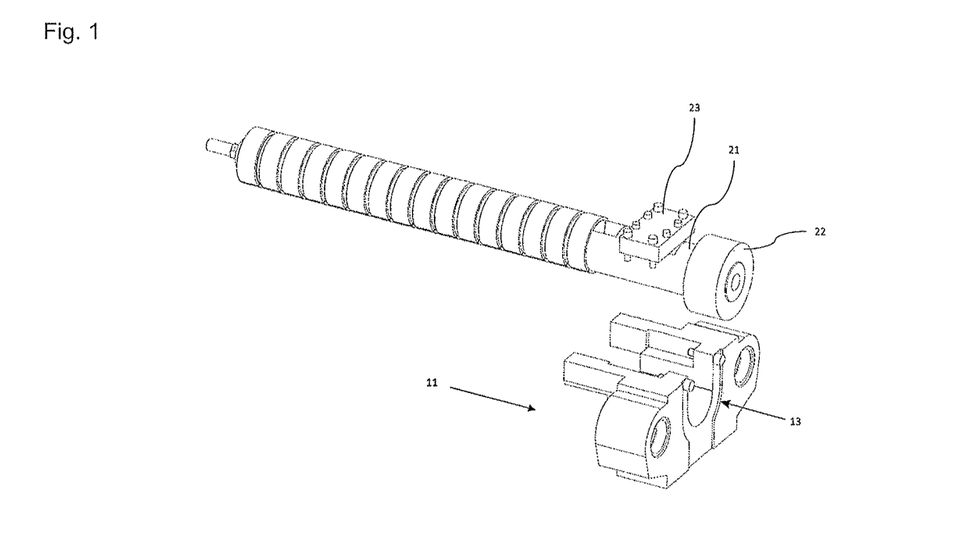
FIG. 1 shows a view of the plasticizing cylinder and the carrier portion in the unassembled condition.

FIG. 1 firstly shows the carrier portion 11 and the plasticizing cylinder 21 in the unassembled condition. For assembly purposes the plasticizing cylinder 21 is lowered into the trough 13 of the carrier portion 11. The clamping element 23 is pre-assembled to the plasticizing cylinder 21 but could also be shaped thereon. By fixing of the clamping element 23 to the carrier portion 11 the plasticizing cylinder 21 is braced between the clamping element 23 and the trough 13. In that condition the collar 22 bears against the carrier portion 11. If now a plasticizing screw arranged in the plasticizing cylinder 21 exerts a pressure on the melt in order to inject plasticized plastic material into a cavity a positively locking action is operative between the collar 22 and the carrier portion 11.

In the present embodiment the trough 13 faces upwardly, but could also face towards the side.

The carrier portion 11 is also referred to as a carrier plate.

Figure 2:
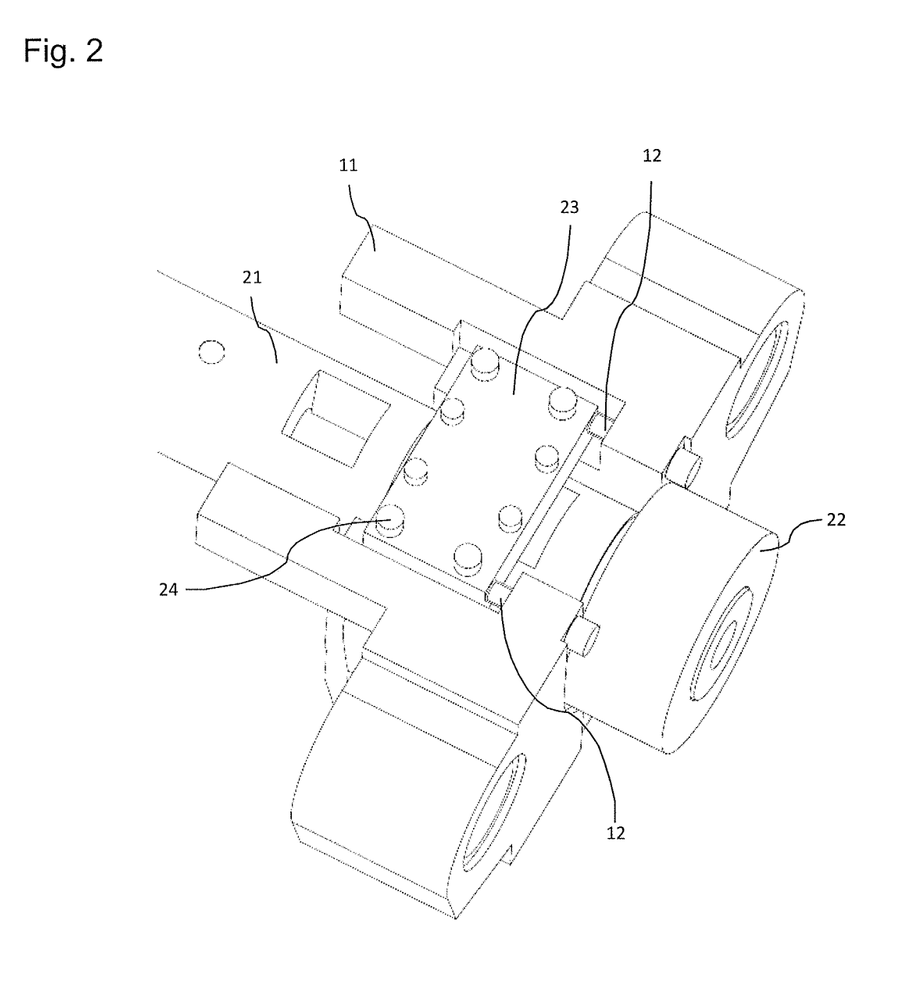
FIG. 2 shows a perspective view of an injection unit according to the invention.

FIG. 2 shows a perspective view of the injection unit in the assembled condition. It will be seen in this respect that the clamping element 23 is fixed to the carrier portion 11 by way of fixing screws 24 (only one is denoted by a reference numeral). It is also possible to see the bracing elements 12 which are to be better seen in FIG. 3a.

In this case the clamping element 23 is releasably fixed to the plasticizing cylinder 21 by means of four screws (without reference numerals). The clamping element 23 however could also be shaped on the plasticizing cylinder 21.

Figure 3A:
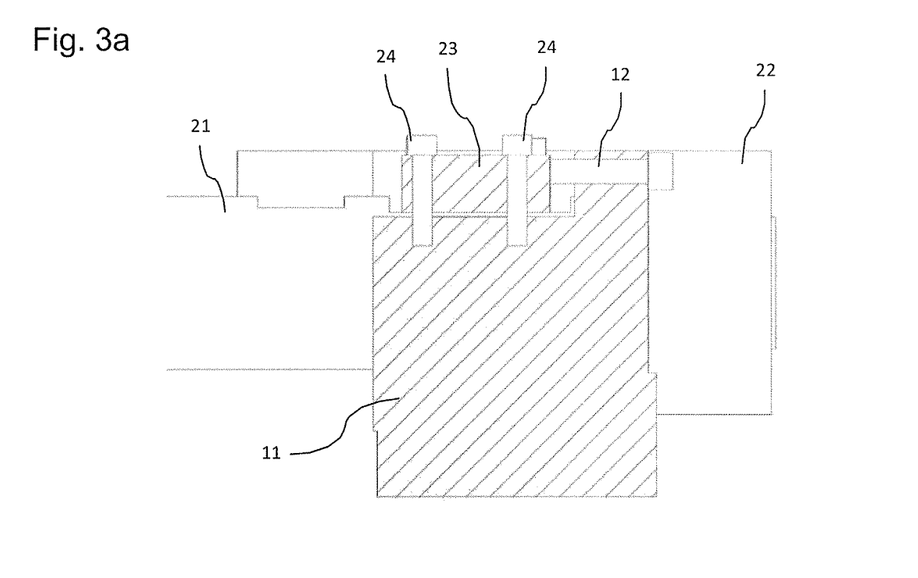
FIGS. 3a, 3b show sectional views of the injection unit according to the invention.

FIG. 3a shows a sectional view through the injection unit of FIG. 2. In this case the section is such that it includes a longitudinal axis of the plasticizing cylinder 21, two fixing elements 24 and a bracing element 12 whereby the arrangement thereof is clearer.

In this embodiment the fixing elements 24 are in the form of fixing screws.

The bracing elements 12 which are in the form of pressure screws pass through bores in the carrier portion 11 and press against the clamping element 23. For that purpose they are supported at a bracing thread in the bores in the carrier portion 11.

According to the invention in this embodiment the plasticizing cylinder 21 was assembled to the carrier portion 11 by the plasticizing cylinder 21 (together with attachments like temperature control means and the like) being lifted into the trough 13 of the carrier portion 11 by means of a crane and suitable hoisting means. Then the collar 22 of the plasticizing cylinder 21 was pressed against the end face of the carrier portion 11 by means of the bracing elements 12 and thus axially braced. Finally, for radial and vertical bracing of the plasticizing cylinder 21 in the trough 13 the clamping element 23 was tightened to the carrier portion 11 by way of the fixing elements 24.

It would also be possible firstly to assemble the fixing elements 24 in order to brace the clamping element 23 on to the plasticizing cylinder 21 and then to tighten the bracing elements 12.

Upon dismantling of the plasticizing cylinder the pressure screws can remain in the carrier portion and can then be tightened again upon the next operation of assembling the plasticizing cylinder.

Figure 3B:
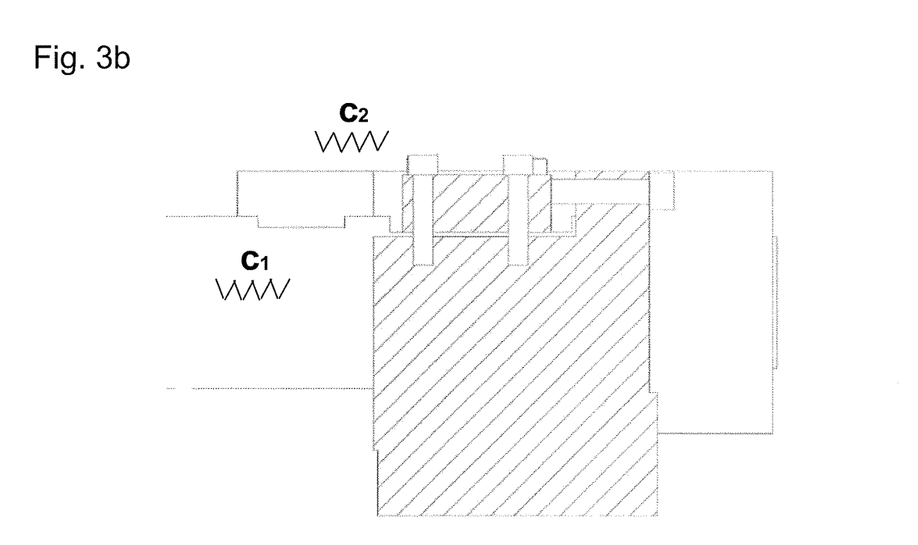

In FIG. 3b FIG. 3a is reproduced without reference numerals, with the equivalent spring stiffnesses $c_1$ and $c_2$ being clearly shown in return.

The equivalent spring stiffness $c_1$ describes the behavior of the plasticizing cylinder 21 under tensile loadings.

The equivalent spring stiffness $c_2$ describes the behavior of the fixing elements 24 under flexural loadings.

In the present embodiment that ratio was positively influenced insofar as firstly the bracing elements 12 were fitted in order to produce defined prestressing in the plasticizing cylinder 21 and only then to tighten the fixing screws.

Figure 4A:
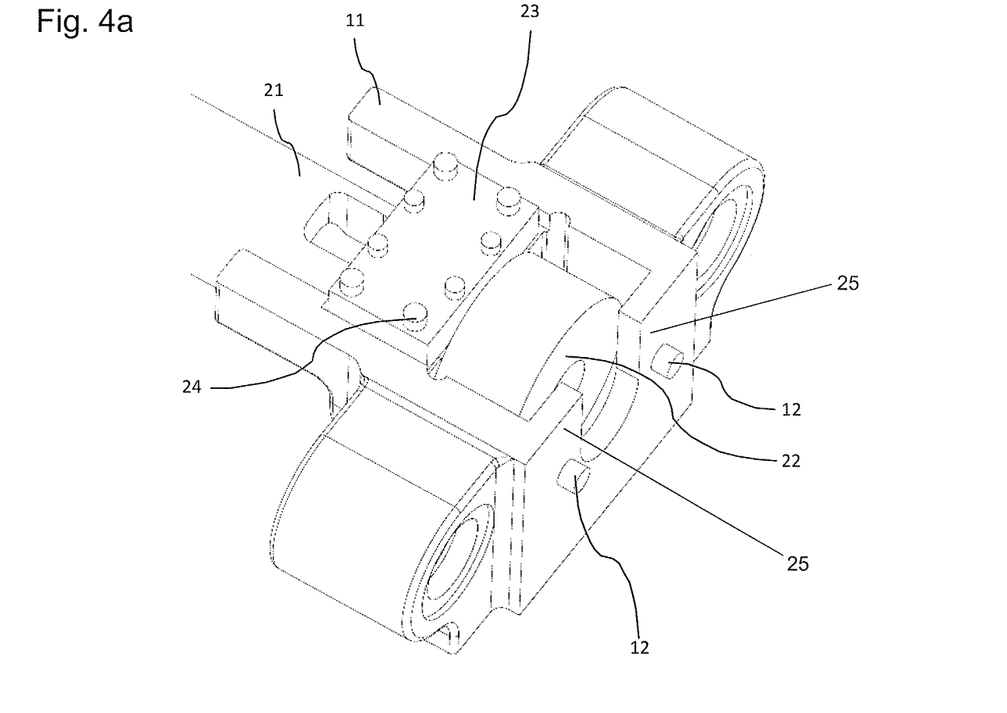
FIGS. 4a, 4b show views of a second embodiment.
Figure 4B:
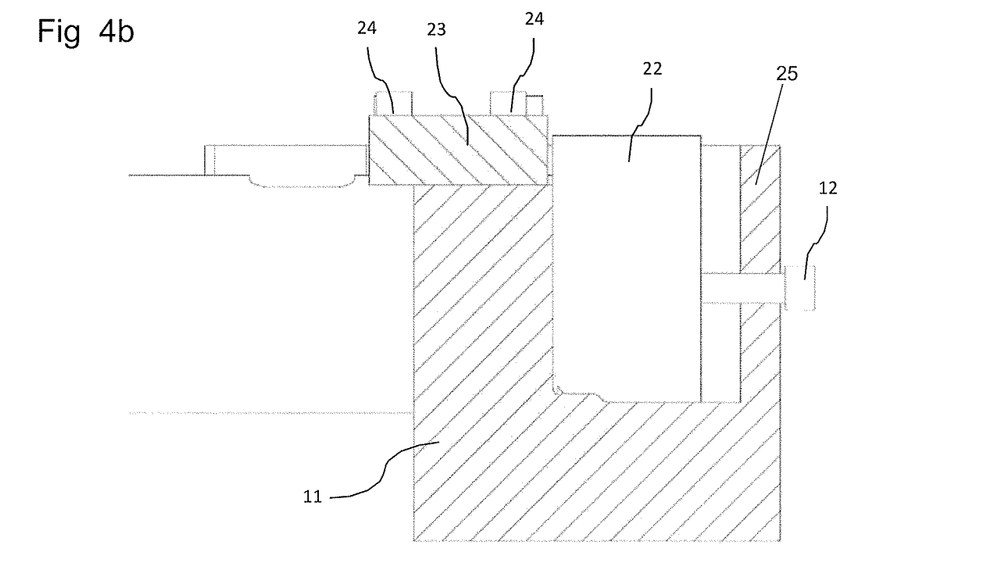

FIG. 4a (corresponding to the view in FIG. 2) and FIG. 4b (corresponding to the view in FIG. 3a) show a second embodiment, wherein the bracing elements 12 act on the collar 22. For that purpose the carrier portion 11 is modified in such a way that the collar is almost completely integrated into the carrier portion 11 (it would naturally also be possible for the collar 22 to be completely let into the carrier portion 11).

As can be seen in particular in FIG. 4b through holes are disposed in those parts (reference numeral 25) of the carrier portion 11, which embrace the collar 22. They are provided with bracing threads, at which bracing elements 12 are supported and press by contact against the collar 22.

Figure 5A:
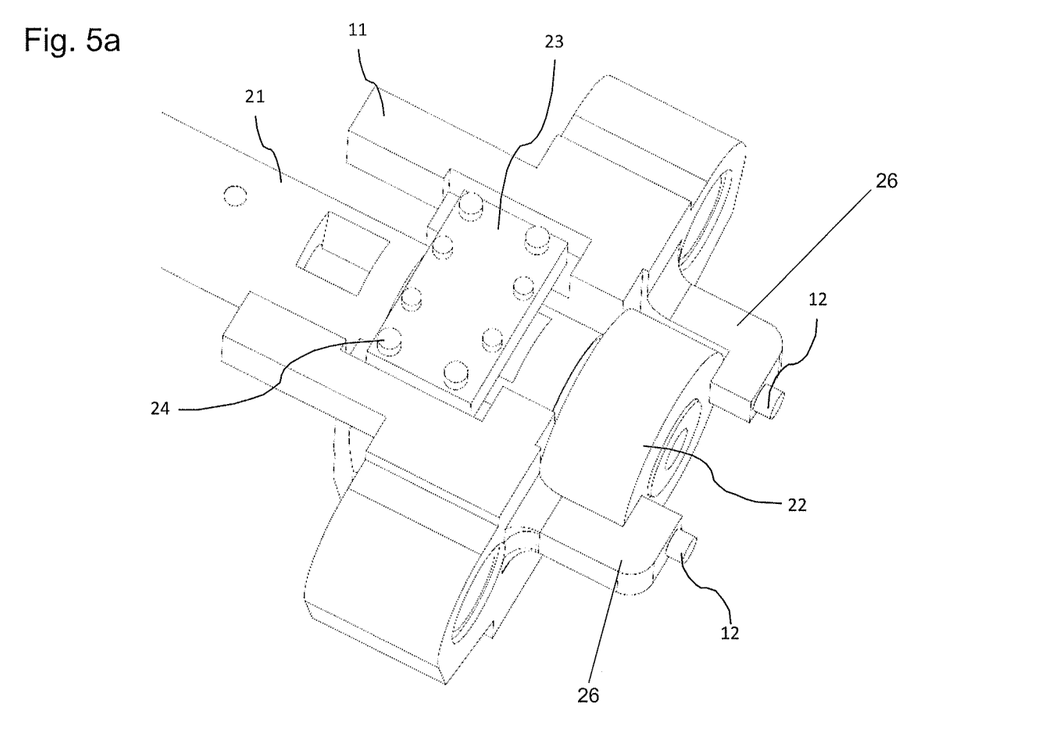
FIGS. 5a, 5b show views of a third embodiment.
Figure 5B:
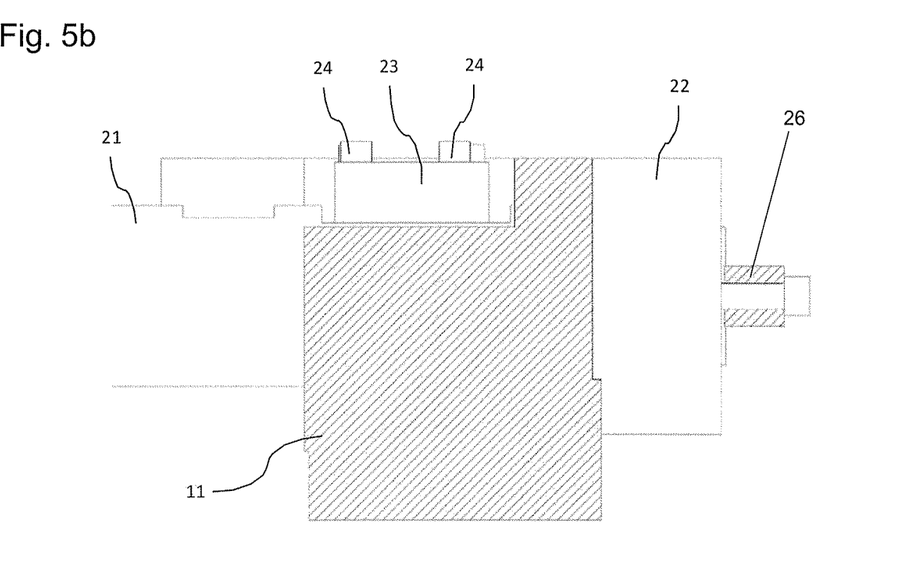

The above-mentioned integration of the collar 22 into the carrier portion 11 is however also not absolutely necessary for the bracing elements 12 to act on the collar 22. FIGS. 5a and 5b show a third embodiment which is similar to the second embodiment. As a distinction in relation to the integration shown in FIGS. 4a and 4b however the bracing threads for the bracing elements 12 are integrated in two swing arms 26. The arms 26 admittedly also embrace the collar 22 but are not flat and therefore do not entail integration of the collar 22 into the carrier portion 11.

Figure 6A:
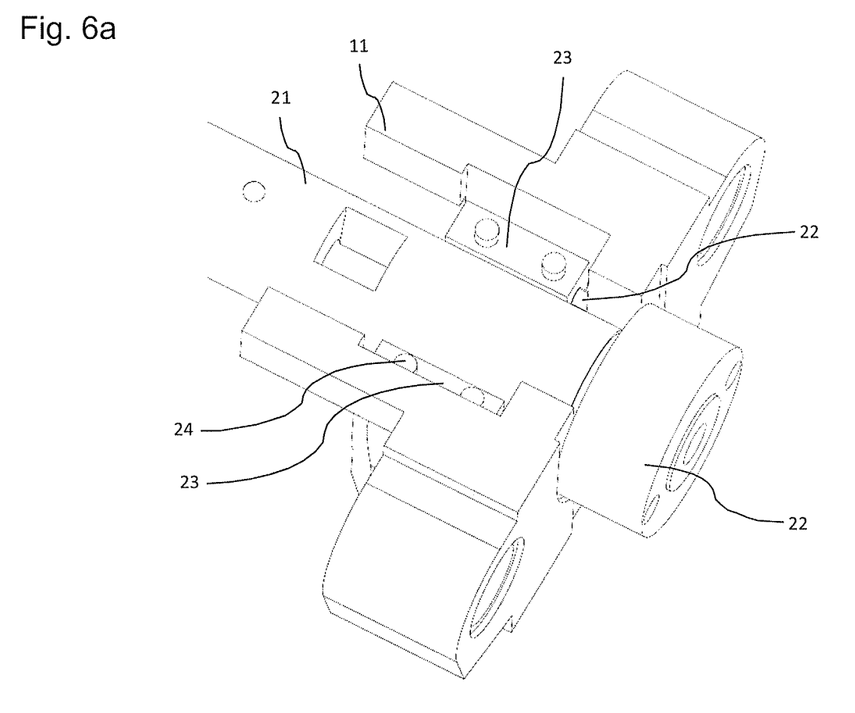
FIGS. 6a, 6b show views of a fourth embodiment.
Figure 6B:
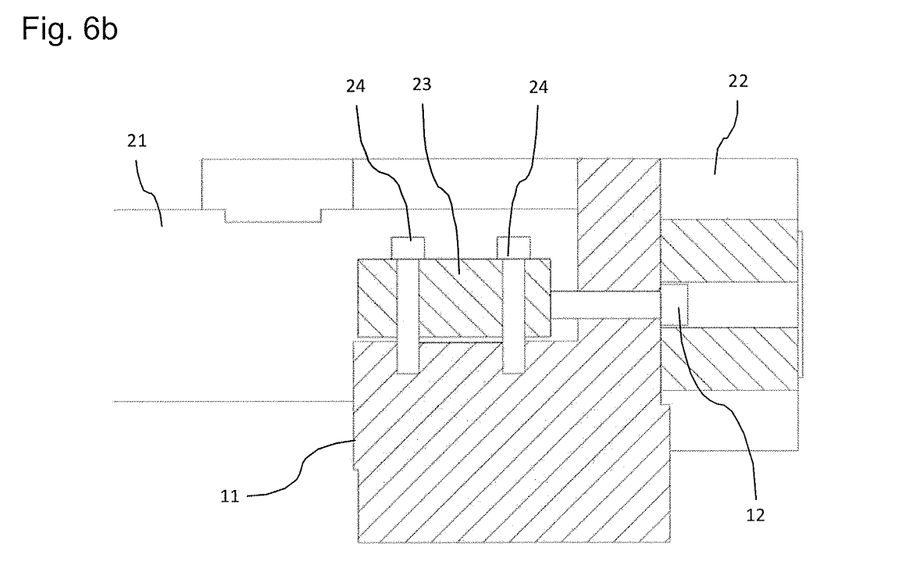

FIGS. 6a and 6b show a fourth embodiment which is similar to the first embodiment (FIGS. 2 and 3a). Unlike the latter however the clamping element 23 is of a two-part structure and is disposed approximately at the height of a center line of the plasticizing cylinder 21.

To facilitate insertion and tightening of the clamping elements 12 in this embodiment they are passed not only through bores in the carrier portion 11 but also through the collar 22. For that purpose the collar 22 has additional through holes, through which the bracing elements 12 can be inserted and tightened.

The invention claimed is:

1. An injection unit for a shaping machine, the injection unit comprising:
a plasticizing cylinder which has a collar; and
a carrier portion which has a trough,
wherein the plasticizing cylinder is arranged in the trough,
wherein an axial movement of the plasticizing cylinder relative to the carrier portion is restrained in positively locking engagement by the collar bearing against the carrier portion and a clamping element which is fixed or shaped on the plasticizing cylinder is fixed using fixing elements to the carrier portion such that the plasticizing cylinder is braced between the trough and the clamping element,
wherein the plasticizing cylinder is braced using pressure screws against lifting of the collar off the carrier portion in an axial direction of the plasticizing cylinder,
wherein the pressure screws pass through bores in the carrier portion,
wherein each of the pressure screws has a head at a first end and a tip at a second end opposite to the first end, and
wherein the tips of the pressure screws abut and press on the clamping element, the plasticizing cylinder, or the collar.

2. The injection unit as set forth in claim 1, wherein the fixing elements are fixing screws which pass through bores in the clamping element and cooperate with fixing threads in the carrier portion.

3. The injection unit as set forth in claim 1, wherein a ratio of a first equivalent spring stiffness ($c_1$) for tensile loadings of the plasticizing cylinder and a second equivalent spring stiffness ($c_2$) for flexural loadings of the fixing elements is greater than 500.

4. The injection unit as set forth in claim 3, wherein the ratio of the first equivalent spring stiffness for tensile loadings of the plasticizing cylinder and the second equivalent spring stiffness for flexural loadings of the fixing elements is greater than 1000.

5. The injection unit as set forth in claim 3, wherein the ratio of the first equivalent spring stiffness for tensile loadings of the plasticizing cylinder and the second equivalent spring stiffness for flexural loadings of the fixing elements is greater than 1500.

6. The injection unit as set forth in claim 1, wherein the clamping element is a plate.

7. The injection unit as set forth in claim 6, wherein the plate is flat.

8. A shaping machine comprising:
an injection unit including:
a plasticizing cylinder which has a collar; and
a carrier portion which has a trough,
wherein the plasticizing cylinder is arranged in the trough,
wherein an axial movement of the plasticizing cylinder relative to the carrier portion is restrained in positively locking engagement by the collar bearing against the carrier portion and a clamping element which is fixed or shaped on the plasticizing cylinder is fixed using fixing elements to the carrier portion such that the plasticizing cylinder is braced between the trough and the clamping element,
wherein the plasticizing cylinder is braced using pressure screws against lifting of the collar off the carrier portion in an axial direction of the plasticizing cylinder,
wherein the pressure screws pass through bores in the carrier portion,
wherein each of the pressure screws has a head at a first end and a tip at a second end opposite to the first end, and
wherein the tips of the pressure screws abut and press on the clamping element, the plasticizing cylinder, or the collar.

9. A method of assembling a plasticizing cylinder to a carrier portion of an injection unit for a shaping machine, the method comprising:

arranging the plasticizing cylinder in a trough of the carrier portion, bracing the plasticizing cylinder using pressure screws against lifting of a collar of the plasticizing cylinder off the carrier portion in an axial direction of the plasticizing cylinder, and bracing the plasticizing cylinder using fixing elements between a clamping element and the trough, wherein the pressure screws pass through bores in the carrier portion, wherein each of the pressure screws has a head at a first end and a tip at a second end opposite to the first end, and wherein the tips of the pressure screws abut and press on the clamping element, the plasticizing cylinder, or the collar.

10. The method as set forth in claim 9, wherein the clamping element is assembled to the plasticizing cylinder before the plasticizing cylinder is arranged in the trough.

* * * * *